US011530155B2

(12) United States Patent
Higginbottom Dahlman et al.

(10) Patent No.: US 11,530,155 B2
(45) Date of Patent: Dec. 20, 2022

(54) STRENGTHENED GLASS ARTICLES WITH SEPARATION FEATURES (71) Applicant: CORNING INCORPORATED, Corning, NY (US)

(72) Inventors: Rebecca Vernon Higginbottom Dahlman, Painted Post, NY (US); William James Miller, Horseheads, NY (US); Katherine Rose Rossington, Corning, NY (US); Alexander Mikhailovich Streltsov, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 334 days.

(21) Appl. No.: 16/556,767

(22) Filed: Aug. 30, 2019

(65) Prior Publication Data

US 2020/0071222 A1 Mar. 5, 2020

Related U.S. Application Data (60) Provisional application No. 62/726,578, filed on Sep. 4, 2018.

(51) Int. Cl.
*C03B 33/06* (2006.01)
*C03C 23/00* (2006.01)
(Continued)

(52) U.S. Cl.
CPC ............ *C03B 33/06* (2013.01); *B23K 26/364* (2015.10); *B65D 1/0215* (2013.01); *B65D 1/42* (2013.01);
(Continued)

(58) Field of Classification Search
None
See application file for complete search history.

(56) References Cited

U.S. PATENT DOCUMENTS 5,206,496 A    4/1993   Clement et al.
8,327,666 B2   12/2012   Harvey et al.
(Continued)

FOREIGN PATENT DOCUMENTS

CN     102356050 A    2/2012
CN     103097313 A    5/2013
(Continued)

OTHER PUBLICATIONS

International Search Report and Written Opinion of the European International Searching Authority; PCT/US2019/048289; dated Nov. 19, 2019; 10 Pgs.

(Continued)

*Primary Examiner* — Lisa L Herring
(74) *Attorney, Agent, or Firm* — F. Brock Riggs (57) ABSTRACT

A method of forming a strengthened glass article is provided. The method includes providing a strengthened glass article. The strengthened glass article is in the form of a container including a sidewall having an exterior surface and an interior surface that encloses an interior volume. The sidewall has an exterior strengthened surface layer that includes the exterior surface, an interior strengthened surface layer that includes the interior surface and a central layer between the exterior strengthened surface layer and the interior strengthened surface layer that is under a tensile stress. A laser-induced intended line of separation is formed in the central layer at a predetermined depth between the exterior strengthened surface layer and the interior strengthened surface layer by irradiating the sidewall with a laser without separating the glass article.

6 Claims, 11 Drawing Sheets (51) Int. Cl.
*B23K 26/364* (2014.01)
*B65D 1/42* (2006.01)
*B65D 1/02* (2006.01)
*C03C 21/00* (2006.01)

(52) U.S. Cl.
CPC ........ *C03C 21/002* (2013.01); *C03C 23/0025* (2013.01)

(56) References Cited

U.S. PATENT DOCUMENTS

| | | | |
|---|---|---|---|
| 8,341,976 | B2 | 1/2013 | Dejneka et al. |
| 9,034,442 | B2 | 5/2015 | Chang et al. |
| 2013/0001237 | A1 | 1/2013 | Marsh |
| 2013/0162986 | A1 | 6/2013 | Kibat et al. |
| 2013/0341228 | A1 | 12/2013 | Click et al. |
| 2014/0120279 | A1* | 5/2014 | DeMartino ............. C03C 21/00 428/34.6 |
| 2015/0136639 | A1 | 5/2015 | Aranda Lopez |
| 2015/0140241 | A1* | 5/2015 | Hosseini ............ B23K 26/0622 428/34.4 |
| 2015/0299018 | A1 | 10/2015 | Bhuyan et al. |
| 2016/0200621 | A1* | 7/2016 | N'Gom ................ B23K 26/359 428/192 |
| 2016/0251260 | A1 | 9/2016 | Bayne et al. |
| 2018/0297887 | A1 | 10/2018 | Spier et al. |

FOREIGN PATENT DOCUMENTS

| | | |
|---|---|---|
| CN | 104254499 A | 12/2014 |
| CN | 104428266 A | 3/2015 |
| CN | 104968620 A | 10/2015 |
| CN | 105209399 A | 12/2015 |
| CN | 106029590 A | 10/2016 |
| CN | 107074611 A | 8/2017 |
| CN | 107406293 A | 11/2017 |
| CN | 107531564 A | 1/2018 |
| CN | 108367962 A | 8/2018 |
| WO | 2014081745 A1 | 5/2014 |
| WO | 2018/093857 A1 | 5/2018 |

OTHER PUBLICATIONS

Chinese Patent Application No. 201980057961.7, Office Action, dated Jul. 27, 2022, 15 pages, (7 pages of English Translation and 8 pages of Original Copy); Chinese Patent Office.

* cited by examiner

STRENGTHENED GLASS ARTICLES WITH SEPARATION FEATURES

CROSS-REFERENCE TO RELATED APPLICATION

This application claims the benefit of priority under 35 U.S.C § 120 of U.S. Provisional Application Ser. No. 62/726,578 filed on Sep. 4, 2018, the content of which is relied upon and incorporated herein by reference in its entirety.

BACKGROUND

Field

The present specification generally relates to glass articles, in particular strengthened glass articles with separation features.

Technical Background

Historically, glass has been used as the preferred material for packaging pharmaceuticals because of its hermeticity, optical clarity, and excellent chemical durability relative to other materials. Specifically, the glass used in pharmaceutical packaging must have adequate chemical durability so as to not affect the stability of the pharmaceutical formulations contained therein. Glasses having suitable chemical durability include those glass compositions within the ASTM standard 'Type IA' and 'Type IB' glass compositions, which have a proven history of chemical durability. A variety of glass containers are used in the pharmaceutical industry, such as vials, cartridges, syringes, ampoules, bottles, jars, and other glass containers or glass articles.

Glass tubing may be converted into glass articles, such as the glass containers for pharmaceutical applications, in "converting machines." for example. Converting machines have been used for over 75 years, and are currently made by various commercial and internal equipment suppliers. These converting machines typically reform long lengths of glass tubing into a plurality of glass articles using steps which include flame working, rotating and stationary tool forming, thermal separation, and/or score and shock cutoff steps.

One of the main drawbacks of using glass containers for pharmaceutical packaging and other applications is the mechanical fragility of the glass. A breakage of such a glass container can be costly because of the loss of the drug but also can raise safety concerns, such as the presence of glass particles inside the container, spoliation of compositions contained within the container, or other safety concerns. One option to enhance the mechanical performance of the glass is to strengthen the glass through a thermal or chemical tempering process. Such strengthened glass containers may be highly resistant to breakage, which can make crack and flaw detection difficult, particularly during normal use, as the strengthened glass containers may maintain general structural integrity.

SUMMARY

Accordingly, a need exists for strengthened glass articles with separation features that can be used to make cracks in the glass more evident, and systems and methods for providing such strengthened glass articles with separation features.

In one or more aspects of the present disclosure, a method of forming a strengthened glass article, the method comprising: providing a strengthened glass article, the strengthened glass article being in the form of a container comprising a sidewall having an exterior surface and an interior surface that encloses an interior volume, the sidewall having an exterior strengthened surface layer that includes the exterior surface, an interior strengthened surface layer that includes the interior surface and a central layer between the exterior strengthened surface layer and the interior strengthened surface layer that is under a tensile stress; and forming a laser-induced intended line of separation in the central layer at a predetermined depth between the exterior strengthened surface layer and the interior strengthened surface layer by irradiating the sidewall with a laser without separating the glass article.

In another aspect, a strengthened glass article in the form of a container, the glass article comprising: a glass body having a top and bottom and a sidewall that extends between the top and the bottom, wherein the sidewall has an exterior surface and an interior surface that encloses an interior volume, the sidewall having an exterior strengthened surface layer that includes the exterior surface, an interior strengthened surface layer that includes the interior surface and a central layer between the exterior strengthened surface layer and the interior strengthened surface layer that is under a tensile stress; and a laser-induced intended line of separation in the central layer at a predetermined depth between the exterior strengthened surface layer and the interior strengthened surface layer.

In another aspect, a method of forming a strengthened glass article, the method comprising: providing a strengthened glass article, the strengthened glass article being in the form of a container comprising a sidewall having an exterior surface and an interior surface that encloses an interior volume, the sidewall having an exterior strengthened surface layer that includes the exterior surface, an interior strengthened surface layer that includes the interior surface and a central layer between the exterior strengthened surface layer and the interior strengthened surface layer that is under a tensile stress; and separating the strengthened glass article using a laser-induced intended line of separation in the central layer at a predetermined depth between the exterior strengthened surface layer and the interior strengthened surface layer by initiating a crack that propagates axially along the sidewall and encounters the intended line of separation, the crack then propagating along the intended line of separation thereby separating the strengthened glass article.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Reference will now be made in detail to embodiments of strengthened glass articles with separation features and systems and methods for producing strengthened glass articles with separation features. Whenever possible, the same reference numerals will be used throughout the drawings to refer to the same or like parts.

Directional terms as used herein—for example up, down, right, left, front, back, top, bottom—are made only with reference to the figures as drawn and the coordinate axis provided therewith and are not intended to imply absolute orientation.

Unless otherwise expressly stated, it is in no way intended that any method set forth herein be construed as requiring that its steps be performed in a specific order, nor that specific orientations be required with any apparatus. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

As used herein, the term "separation features" refers to areas of the glass article of structural weakness, such as an intended line of separation. Such lines may be solid (i.e., continuous) or formed as a series of aligned dots or dashes or combinations thereof that together form a line. The dots or dashes of an intended line of separation may have a regular or irregular spacing between adjacent dots or dashes. Lines may be straight, curved or combinations thereof in their extent.

As used herein, the term "pattern" refers to one or more lines that follow a repeated arrangement, such as a spiral.

As used herein, "axial" refers to the heightwise direction of the glass containers provided in the figures.

Pharmaceutical containers may be made of glass because of its hermeticity, optical clarity, and excellent chemical durability relative to other materials. Some glass articles and glass sheets, such as those including aluminosilicate glass compositions, may be chemically strengthened by ion exchange. In the ion exchange strengthening process, ions in the surface layer of the glass are replaced by—or exchanged with—larger ions having the same valence or oxidation state. In some glass compositions capable of being ion-exchanged, the ions in the surface layer of the glass composition and the larger ions may be monovalent alkali metal cations, such as $L^+$, $Na^+$, $K^+$, $Rb^+$, and $Cs^+$. Due to the presence of alkali metal ions in the glass matrix of aluminosilicate glass compositions, aluminosilicate glasses may be easily chemically tempered through ion exchange processes.

Glass tubing and glass articles made therefrom and having improved mechanical durability can also be produced by forming laminated glass tubing and converting the laminated glass tubing into the glass articles. Laminated glass tubing may include a plurality of glass layers as described in, for example, U.S. Pat. No. 9,034,442, the entirety of which is incorporated by reference herein. For example, in some embodiments, laminated glass tubing may include a core layer and at least one clad layer. The clad layer may include at least an inner clad layer proximate the inner portion of the core layer and an outer clad layer proximate the outer portion of the core layer. In such embodiments, if the thermal expansion coefficients (CTE) of the glass compositions of the inner clad layer and outer clad layer are different than the CTE of the glass composition used for the core layer, then the difference in thermal expansion of each of the glass layers may result in compressive stress in the inner clad layer and the outer clad layer and tensile stress in the core layer. Producing compressive stress in the clad layer may increase the mechanical durability of the glass by increasing the resistance of the outer surface of the glass to surface damage.

Figure 1:
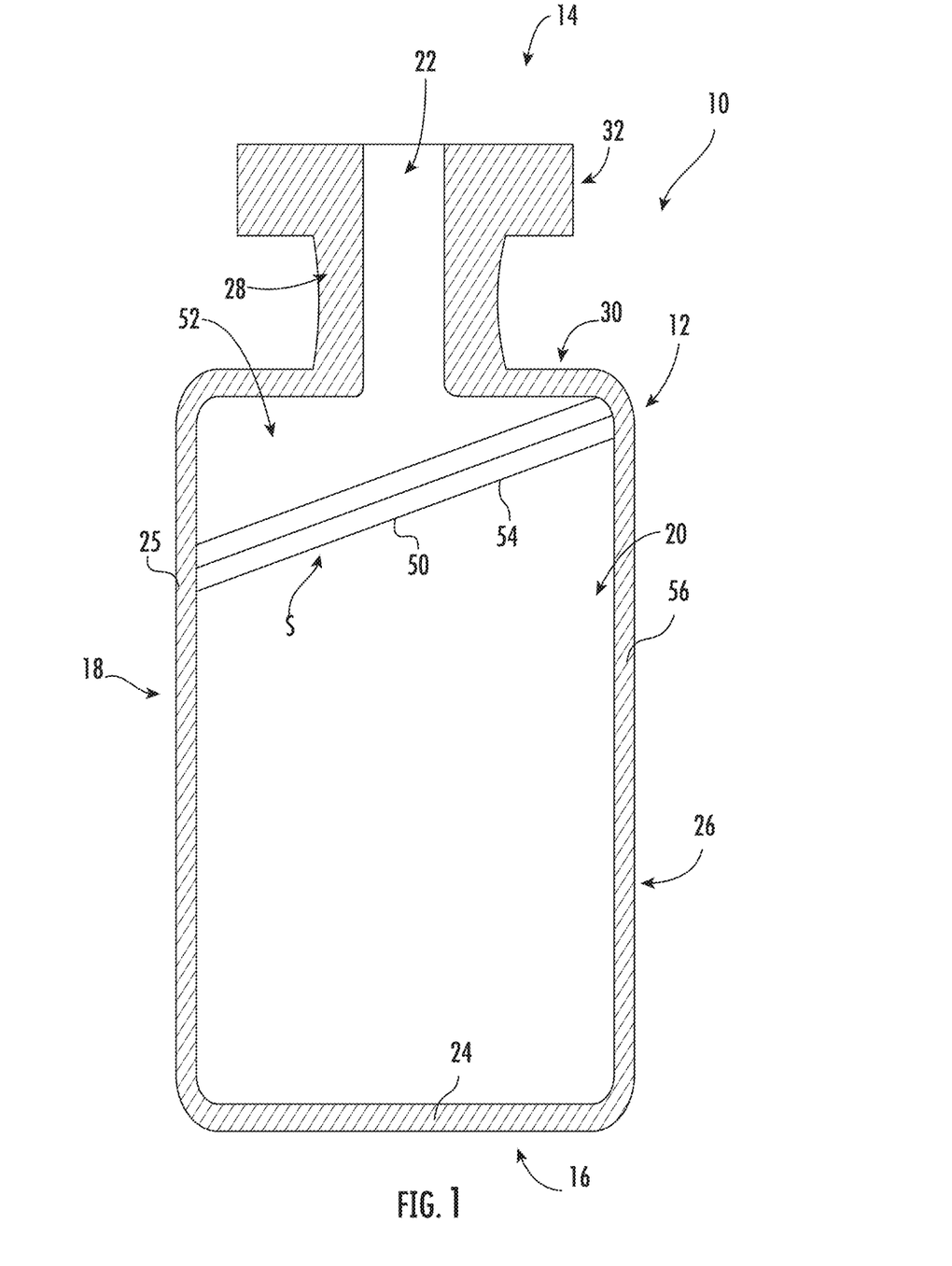
FIG. 1 is a diagrammatic, side view of a strengthened glass article including an intended line of separation, according to one or more embodiments shown and described herein.

Referring to FIG. 1, a glass article in the form of a glass container 10 is shown in section, which may be suitable for storing a pharmaceutical composition. The glass container 10 generally includes a glass body 12 having a top 14, a bottom 16 and a middle 18 that extends between the top 14 and the bottom 16. The glass body 12 may be enclosed thereby defining an interior volume 20. An opening 22 may be provided at the top 14, which can provide access to the interior volume 20. In some embodiments, the glass body 12 also includes a base 24 that closes the bottom 16 of the interior volume 20. The base 24 may be substantially flat, as shown, or some other suitable shape, such as rounded.

The glass body 12 includes a sidewall 25 that forms an enlarged portion 26 that defines a majority of the interior volume 20 and a necked-down portion 28 that is connected to the enlarged portion 26 by a shoulder 30. The necked-down portion 28 extends from the shoulder 30 to a flange 32 that extends radially outward from the necked-down portion 28 thereby overhanging the shoulder 30. The flange 32 can be used to engage a cap, which can be used to close the opening 22 and inhibit unintended access to the interior volume 20.

While the glass container 10 is depicted in FIG. 1 as having a specific shape form (a vial), it should be understood that the glass container may have other shape forms, including, but not limited to. Vacutainers®, cartridges, syringes, ampoules, bottles, flasks, phials, tubes, beakers, and the like. It should be understood that the glass containers described herein may be used for a variety of applications including, without limitation, pharmaceutical packages, beverage containers, and the like.

Figure 2:
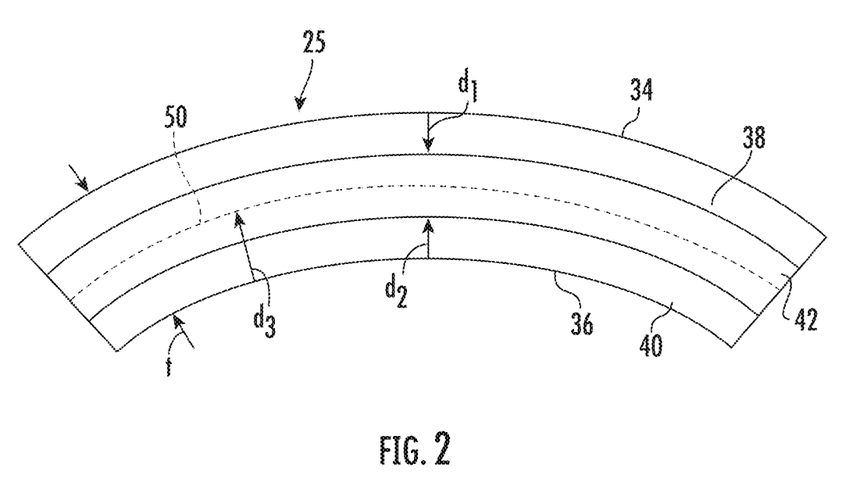
FIG. 2 is a diagrammatic top section view of a portion of the strengthened glass article of FIG. 1, according to one or more embodiment shown and described herein.

Referring to FIG. 2, a section of the glass container 10 is shown in greater detail and includes an exterior surface 34 and an interior surface 36 that is parallel (e.g., concentric) with the exterior surface 34 defining a thickness t therebetween. The sidewall 25 is compressively strengthened at the exterior surface 34 and the interior surface 36 providing strengthened surface layers 38 and 40 extending from the exterior surface 34 and the interior surface 36, respectively, to depths $d_1$ and $d_2$. Strengthened surface layers 38 and 40 are under a compressive stress, while a central layer 42 between the strengthened surface layers 38 and 40 is under a tensile stress, or in tension. The tensile stress in central layer 42 balances the compressive stresses in strengthened surface layers 38 and 40, thus maintaining equilibrium within the sidewall 25. The depths $d_1$ and $d_2$ to which the strengthened surface layers 38 and 40 extend are generally referred to individually as the "depth of layer." Thickness t of sidewall 25 is generally in a range from about 0.2 mm up to about 2 mm and, in some embodiments, up to about 3 mm. In one embodiment, thickness t is in a range from about 0.5 mm up to about 1.3 mm.

In the embodiments described herein, the depth of layer of the strengthened surface layers 38 and 40 may be greater than or equal to about 3 µm. In some embodiments, the depth of layer may be greater than or equal to about 25 µm or even greater than or equal to about 30 µm. For example, in some embodiments, the depth of layer may be greater than or equal to about 25 µm and up to about 150 µm. In some other embodiments, the depth of layer may be greater than or equal to about 30 µm and less than or equal to about 150 µm. In yet other embodiments, the depth of layer may be greater than or equal to about 30 µm and less than or equal to about 80 µm. In some other embodiments, the depth of layer may be greater than or equal to about 35 µm and less than or equal to about 50 µm.

The strengthened surface layers 38 and 40 generally have a surface compressive stress (i.e., a compressive stress as measured at the exterior and interior surfaces 34 and 36) of greater than or equal to 150 MPa. In some embodiments, the surface compressive stress may be greater than or equal to 200 MPa, or even greater than or equal to 250 MPa. In some embodiments, the surface compressive stress may be greater than or equal to 300 MPa. or even greater than or equal to 350 MPa. For example, in some embodiments, the surface compressive stress may be greater than or equal to about 300 MPa and less than or equal to about 750 MPa. In some other embodiments, the surface compressive stress may be greater than or equal to about 400 MPa and less than or equal to about 700 MPa. In still other embodiments, the surface compressive stress may be greater than or equal to about 500 MPa and less than or equal to about 650 MPa. The stress in strengthened glass articles can be measured with an FSM (Fundamental Stress Meter) instrument. This instrument couples light into and out of the birefringent glass surface. The measured birefringence is then related to stress through a material constant, the stress-optic or photoclastic coefficient (SOC or PEC). Two parameters are obtained: the maximum surface compressive stress (CS) and the exchange depth of layer (DOL). Alternatively, the stress and depth of layer may be measured using refractive near field stress measurement techniques.

It has been discovered that introducing one or more intended lines of separation 50 within the central layer 42 and between the strengthened surface layers 38 and 40, where the sidewall 25 is in tension, can encourage the glass body 12 to separate along the intended line of separation 50 should a crack propagate along the glass body 12 in the axial direction and encounter the intended line of separation 50. For a glass thickness t, it may be desirable to provide a central tension (CT) in the central layer 42 above a predetermined threshold (e.g., above 25 MPa for 0.6 mm-1 mm thickness) as a result of the strengthening process, to encourage complete separation of the glass body 12 along the intended line of separation 50 without application of an outside force. In some embodiments, the predetermined threshold of the CT in the central layer 42 may be at least about 13 MPa, such as at least about 15 MPa, such as at least about 18 MPa, such as at least about 20 MPa, such as at least about 23 MPa, such as at least about 30 MPa, such as at least about 35 MPa. Details of formation of an intended line of separation are described below.

FIG. 1 illustrates a first exemplary pattern 52 formed by the intended line of separation 50 that is formed between the strengthened surface layers 38 and 40 (FIG. 2). In this example, the pattern 52 formed by the intended line of separation 50 is provided in the enlarged portion 26 of the glass body 12, between the shoulder 30 and the base 24. The pattern 52 may be in the form of a three-dimensional spiral S having individual turns 54 that are formed about a perimeter 56 (e.g., circumference) of the glass body 12.

Figure 3:
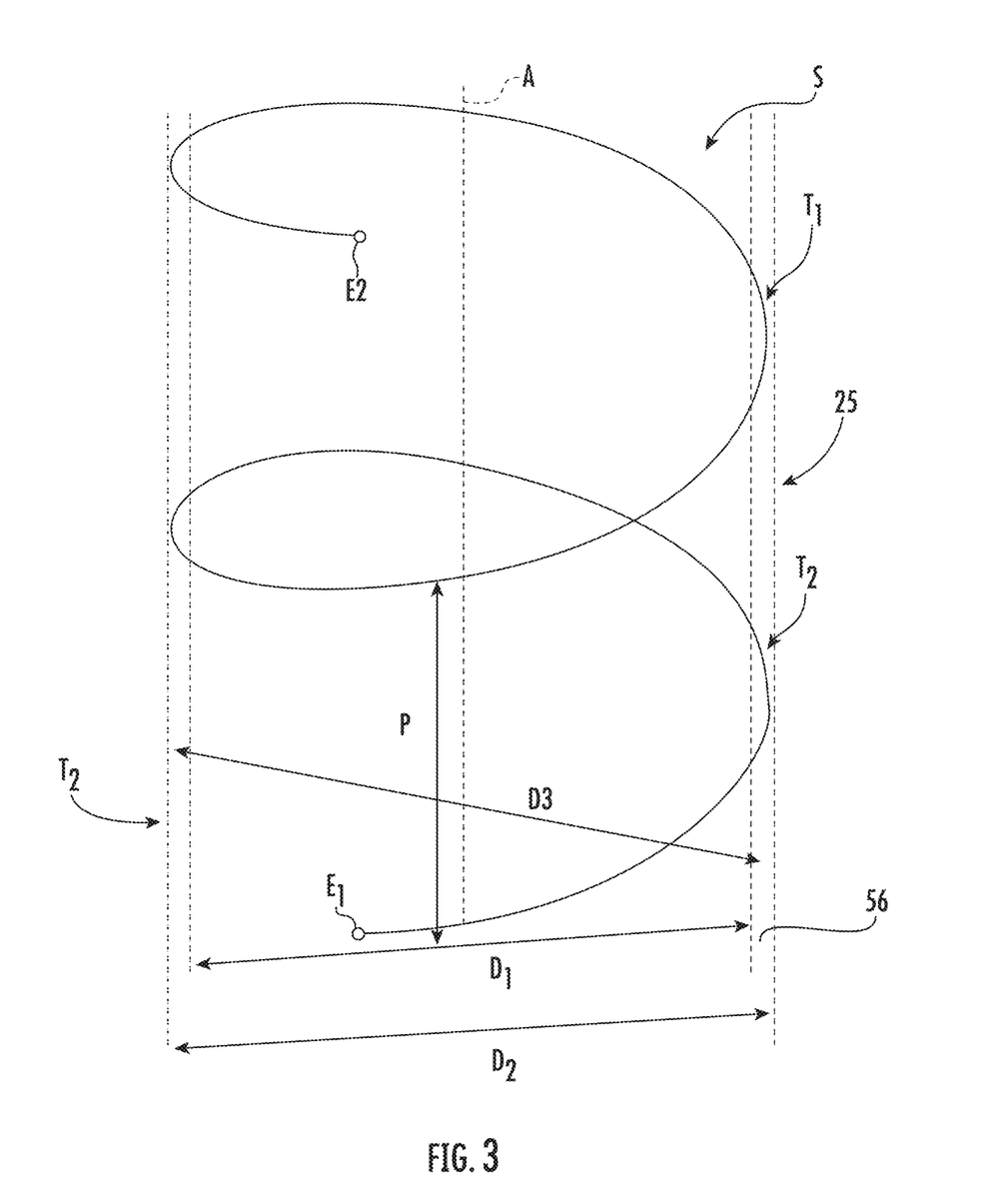
FIG. 3 is a diagrammatic view of an intended line of separation in the form of a spiral, according to one or more embodiments shown and described herein.

Referring to FIG. 3, a diagrammatic view of a spiral S in the form of a helix formed in the sidewall 25 of the glass body 12 for illustrative purposes. A "helix" has a tangent line at any point that makes a constant angle with axis A. In the illustrated embodiment, since the inner diameter $D_1$ and outer diameter $D_2$ of the glass body 12 are constant in the region of the helix, the helix may be referred to as a circular helix having a constant diameter $D_3$. The diameter $D_3$ may be constant or change depending, at least in part, on the shape of the glass body 12. Further, other spiral and non-spiral shapes are possible, as will be described herein.

As indicated above, the glass body 12 has an inner diameter $D_1$ that passes through the axis A and to the interior surface 36. The glass body also has the outer diameter $D_2$ that passes through the axis A and to the exterior surface 34. The spiral S includes a number of turns. A "turn" refers to a complete 3600 extent of the intended line of separation 50 about the axis A. The number of turns, or a fraction of a turn, may be obtained by counting the number of times the spiral completes 3600 about the glass body 12 from end $E_1$ to end $E_2$. In the example, of FIG. 3, there are two turns $T_1$ and $T_2$. As used herein. "at least one turn" may refer to a single turn (of 360 degrees), a single turn plus a fraction of a turn, multiple turns and multiple turns plus a fraction of a turn. A turn may be subdivided into degrees or fractions between zero degrees and 360°. For example, half a turn is 180°. The pitch P is the distance between turns measured along a line parallel to the axis A. It should be noted that, while the intended line of separation is illustrated as a line, the intended line of separation 50 has a width and a thickness. For example, the width of the intended line of separation 50 may be between about 5 µm and about 50 µm and the thickness may be between about 1 µm and 10 µm. The dimensions of the intended line of separation 50 may depend, at least in part, on the CT in the central layer 42. For example, as the lower the CT, the greater the width and thickness dimensions. The pitch P may be, for example, no more than about 2 mm, such as no more than about 0.5 mm, such as no more than about 0.1 mm.

Figure 4:
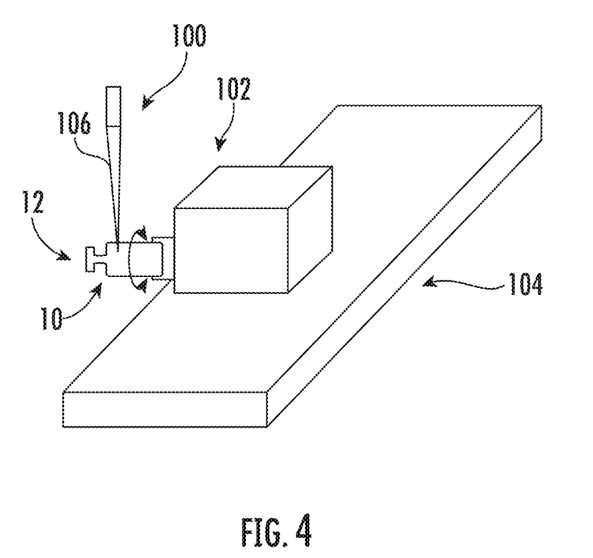
FIG. 4 is a system and apparatus for forming an intended line of separation in a glass article, according to one or more embodiments shown and described herein.

Referring to FIG. 4, the intended lines of separation may be formed by irradiating glass body 12 with a laser 100 that operates in the window of transparency of the glass transmission spectrum. In the embodiment of FIG. 4, the glass article 10 may be held as a workpiece within a chuck 102, which in turn, is mounted upon an X-Y motorized positioning apparatus 104 that can move the glass article 10 in the X-Y plane while the glass article 10 is rotated using the chuck 102. Damage within the bulk of glass body 12 may be generated by nonlinear absorption when the intensity or fluence of the laser beam 106 exceeds a threshold value. Rather than creating damage lines by heating the glass, nonlinear absorption creates damage lines by breaking molecular bonds within the central layer 42; the bulk of strengthened glass body 12 experiences no excessive heating. The wavelength may be picked up in the transparency region of the glass material to enable focusing in the middle of the sidewall without attenuation. In one embodiment, the laser 100 is a nanosecond pulsed Nd laser operating at the fundamental wavelength of 1064 nm (near-IR), or harmonics thereof (e.g., 532 nm (green), 355 nm (ultraviolet)), with a repetition rate of 10-150 kHz. The power of the nanosecond-pulsed Nd laser may be in a range from about 1 W up to about 4 W.

The formation of damage lines in strengthened glass body 12 by laser irradiation is schematically shown in FIG. 2. A laser-formed intended line of separation 50 is formed by irradiating glass body 12 with laser beam 106, which is generated by laser 100 and laser optics that are needed to focus laser beam 106. Laser beam 106 is focused above interior surface 36 to form the intended line of separation 50. The intended line of separation 50 is formed at a depth $d_3$ from interior surface 36, where $d_3$ is greater than depth $d_2$ of interior strengthened surface layer 40. Thus, the intended line of separation 50 is located within central layer 42, which is under tensile stress, and outside the interior surface layer 40 and exterior surface layer 38—that are under compressive stress. At least one of article 10 and laser beam 106 is rotated and translated to form the intended line of separation 50. In one embodiment, glass article 10 is both rotated using the chuck 102 and translated using the motorized positioning apparatus 104 with respect to laser beam 106. Such movement may be accomplished using translatable stages, tables, beam scanners, and the like.

Example

Figure 5:
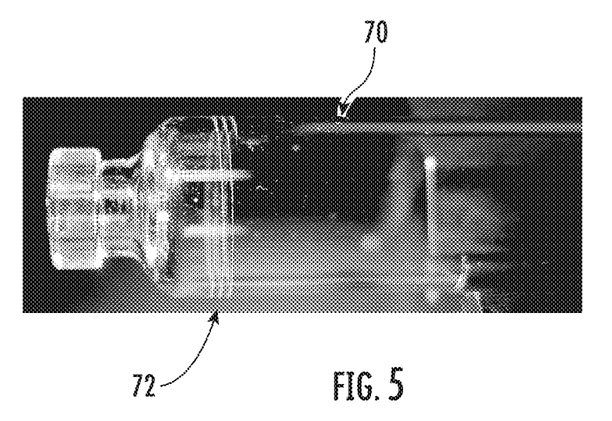
FIG. 5 is a side view of a strengthened glass article including an intended line of separation, according to one or more embodiments shown and described herein.

A laser inscribed pattern 72 was formed as shown by FIG. 5. The output of a UV (355 nm wavelength), nanosecond pulsed laser was focused within the central layer (CT=37 MPa) of an ion-exchanged glass article 70 in the form of a cartridge. The cartridge 70 had a diameter of about 12 mm with a wall thickness of about 0.7 mm. The glass article 70 was spun in a chuck at about 400 rpm and simultaneously translated in the axial direction with a speed allowing for a 0.5 mm pitch. The duration of the laser irradiation was controlled such that three turns were formed within the sidewall of the glass article as shown with a laser power in the 2.5 W-3 W range.

Figure 6:
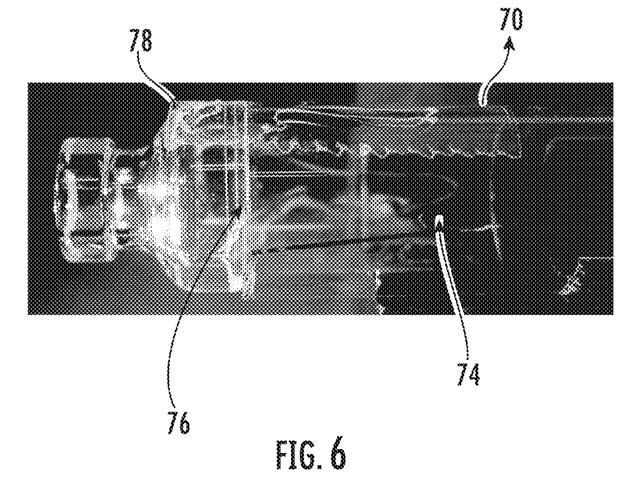
FIG. 6 is a side view of the strengthened glass article of FIG. 5 with an axially propagated crack and separation line along the intended line of separation.

Referring to FIG. 6, a crack 74 was mechanically initiated in the bottom of the glass article that propagated in the axial direction. It was observed that the crack propagated and then stopped at the first turn encountered. The crack 74 then propagated along the first turn, around the glass body forming a line of separation 76 and the glass article broke apart along the intended line of separation in about 2 minutes. FIG. 6 illustrates the separated sections of the glass body connected by tape 78.

Figure 7:
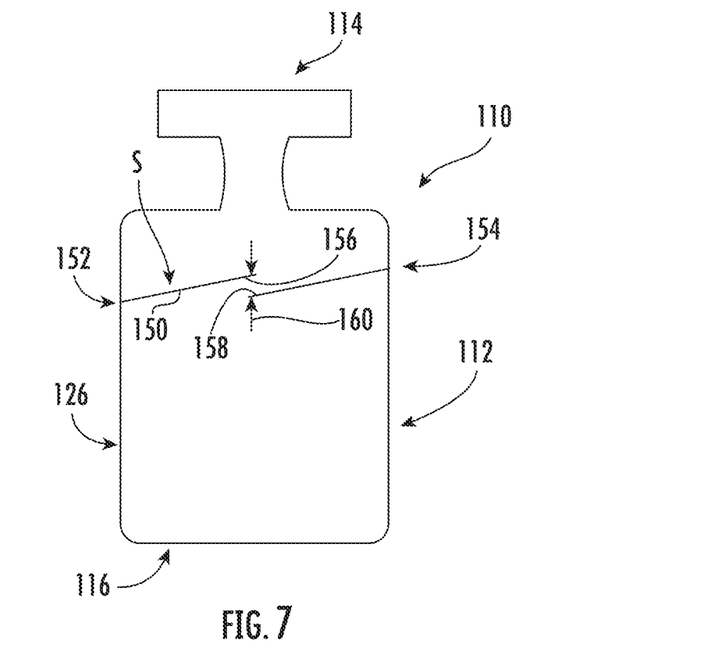
FIG. 7 is a diagrammatic side view of another strengthened glass article including an intended line of separation, according to one or more embodiments shown and described herein.

While helices with multiple turns are described above, other shapes may be used for the intended line of separation. Referring to FIG. 7, a glass article 110 is illustrated that includes many of the features described above, such as glass body 112 having top 114, bottom 116 and enlarged portion 126. In this embodiment, the glass body 112 includes a pattern 152 formed by an intended line of separation 150 in the form of a spiral S that includes one turn 154 plus a fraction of a turn, such that end portions 156 and 158 of the intended line of separation 150 overlap. A gap 160 exists between the end portions 156 and 158. The gap 160 may be no more than about 1 mm, such as no more than about 0.75 mm, such as no more than about 0.5 mm, such as no more than about 0.25 mm, such as no more than about 0.1 mm in axial dimension. Controlling the axial dimension of the gap 160 (and pitch) can allow the crack to propagate from one end portion 158 to the other end portion 156 in order to completely separate the glass body 112 into separate portions.

Figure 8:
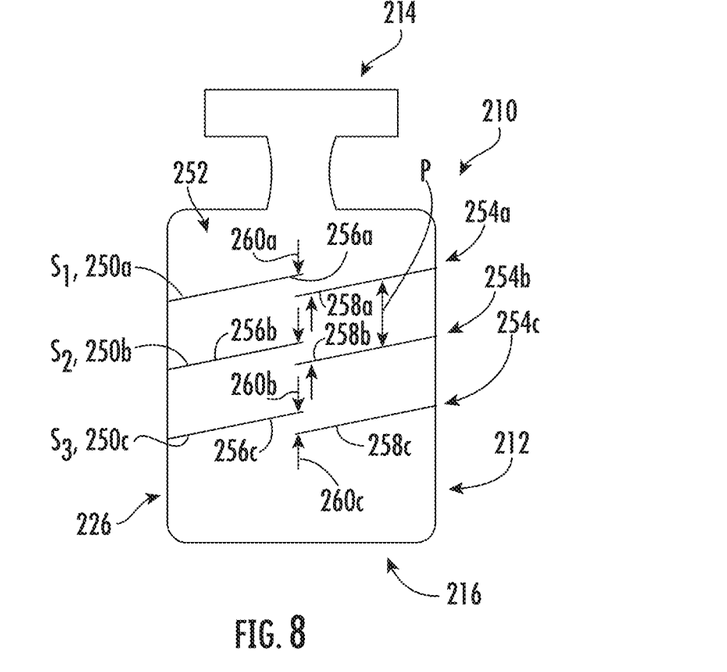
FIG. 8 is a diagrammatic side view of another strengthened glass article including an intended line of separation, according to one or more embodiments shown and described herein.

Referring to FIG. 8, another embodiment of a glass article 210 includes a glass body 212 having a top 214, bottom 216 and enlarged portion 226. In this embodiment, the glass body 212 includes a pattern 252 formed by multiple, spaced-apart intended lines of separation 250a, 250b and 250c, each in the form of spiral S1, S2 and S3 that includes one turn 254a, 254b and 254c plus a fraction of a turn, such that end portions 256a and 258a, 256b and 258b, 256c and 258c overlap. Gaps 260a, 260b and 260c are provided between the end portion 256a and 258a. 256b and 258b. 256c and 258c. In this example, the distances of the gaps 260a, 260b and 260c are all different; however, the distances of the two or more of the gaps 260a, 260b and 260c may be the same. Further, the pitch P between adjacent spirals S1, S2 and S3 may be any suitable distance, such as about 2 mm, or less, such as about 1 mm or less, such as about 0.5 mm or less, such as about 0.25 mm or less.

Figure 9:
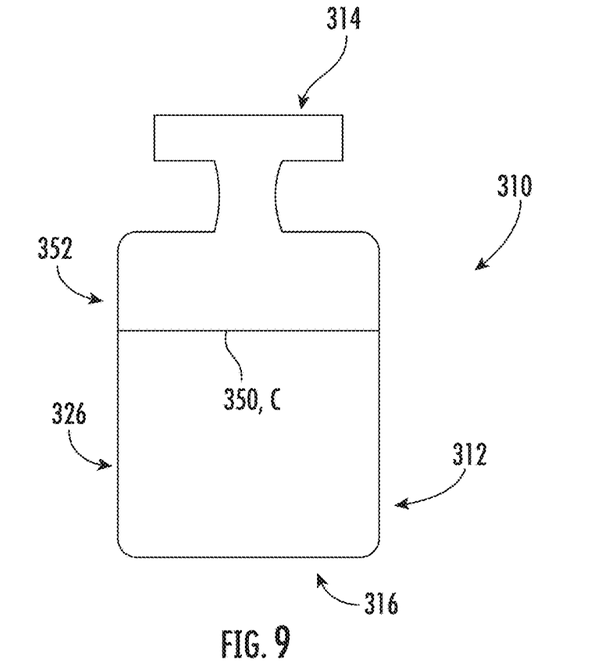
FIG. 9 is a diagrammatic side view of another strengthened glass article including an intended line of separation, according to one or more embodiments shown and described herein.

FIG. 9 illustrates another glass article 310 that includes a glass body 312 having a top 314, bottom 316 and enlarged portion 326. In this embodiment, the glass body 312 includes a pattern 352 formed by an intended line of separation 350 in the form of a closed circle C, as opposed to an open ended spiral, as described above.

Figure 10:
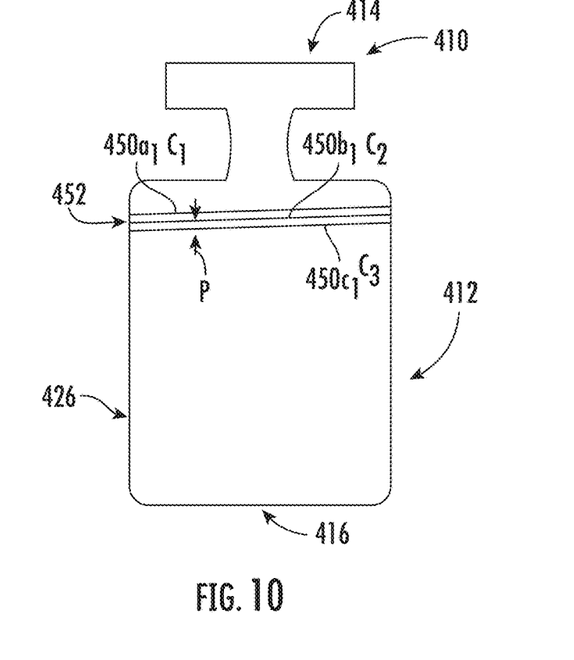
FIG. 10 is a diagrammatic side view of another strengthened glass article including an intended line of separation, according to one or more embodiments shown and described herein.

Referring to FIG. 10, another embodiment of a glass article 410 includes a glass body 412 having a top 414, bottom 416 and enlarged portion 426. In this embodiment, the glass body 412 includes a pattern 452 formed by multiple, spaced-apart intended lines of separation $450a_1$, $450b_1$, and $450c_1$, each in the form of a circle C1, C2 and C3. Further, the pitch P between adjacent circles C1, C2 and C3 may be any suitable distance, such as about 2 mm, or less, such as about 1 mm or less, such as about 0.5 mm or less, such as about 0.25 mm or less.

Figure 11:
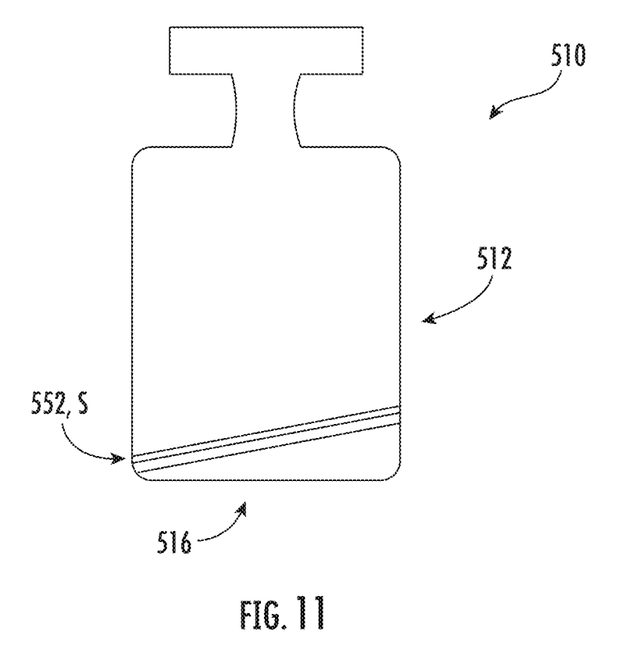
FIG. 11 is a diagrammatic side view of another strengthened glass article including an intended line of separation, according to one or more embodiments shown and described herein.

Referring to FIG. 11, while the patterns of the intended lines of separation described above are located at an upper half of the enlarged portions of the glass articles described above, the patterns may be located at a lower half (i.e., nearer the bottom than the shoulder) or even along an entire axial length of the enlarged portion. FIG. 11, as an example, illustrates a glass article 510 that includes a pattern 552 a spiral S in the form of a helix near a bottom 516 of glass body 512. Such an arrangement may be desirable for glass articles that typically rest on their caps, as an example.

Figure 12:
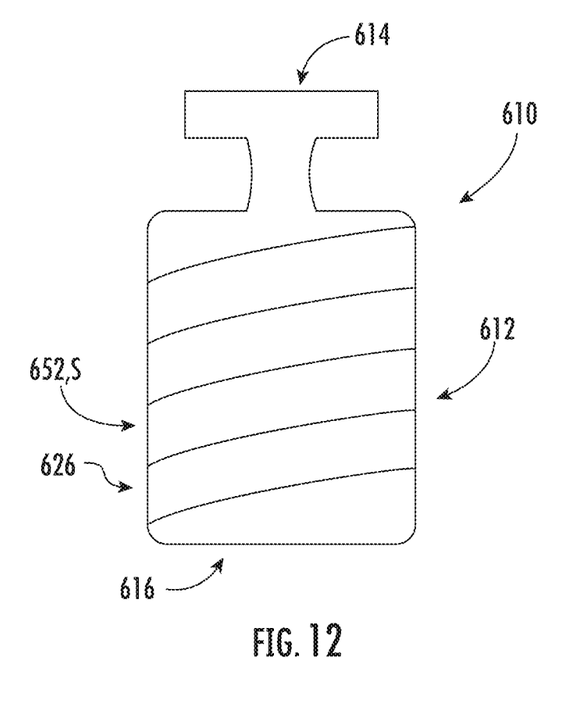
FIG. 12 is a diagrammatic side view of another strengthened glass article including an intended line of separation, according to one or more embodiments shown and described herein.

Referring to FIG. 12, another embodiment of a glass article 610 includes a glass body 612 having a top 614, bottom 616 and enlarged portion 626. In this embodiment, the glass body 612 includes a pattern 652 in the form of a spiral S that extends over a majority of an axial length of the enlarged portion 626. For example, the spiral S may extend over at least 50 percent, at least 60 percent, at least 70 percent, at least 80 percent, or even the entire length of the enlarged portion 626.

Figure 13:
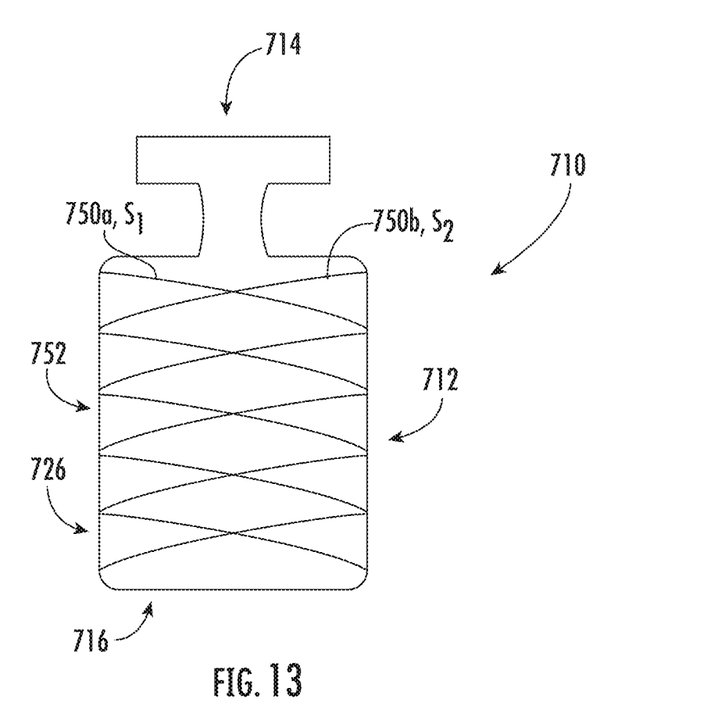
FIG. 13 is a diagrammatic side view of another strengthened glass article including an intended line of separation, according to one or more embodiments shown and described herein.

Referring to FIG. 13, another embodiment of a glass article 710 includes a glass body 712 having a top 714, bottom 716 and enlarged portion 726. In this embodiment, the glass body 712 includes a pattern 752 formed by multiple, spaced-apart intended lines of separation 750a and 750b that form spirals S1 and S2 that intersect and form a double helix.

Figure 14:
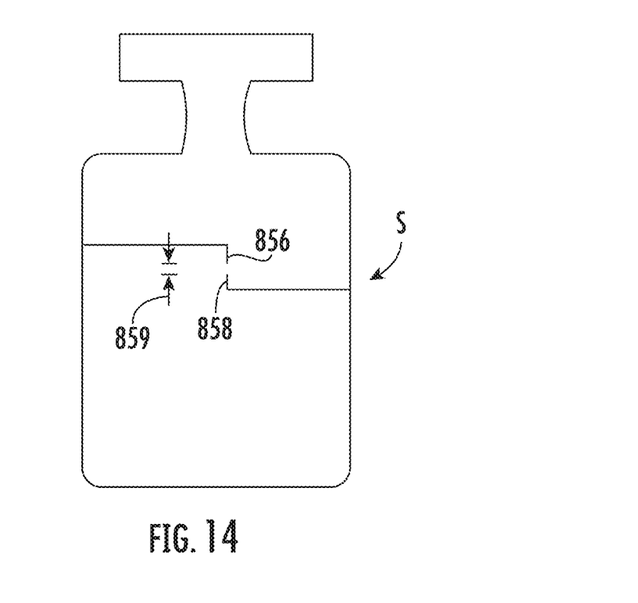
FIG. 14 is a diagrammatic side view of another strengthened glass article including an intended line of separation, according to one or more embodiments shown and described herein.
Figure 15:
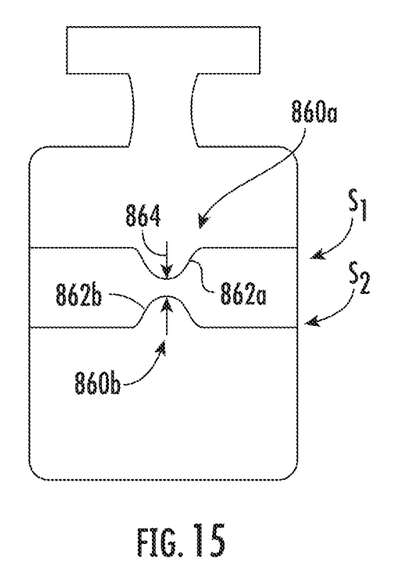
FIG. 15 is a diagrammatic side view of another strengthened glass article including an intended line of separation, according to one or more embodiments shown and described herein.

Other geometric features may be formed by the intended lines of separation that may be used to facilitate separation of the glass articles. Referring to FIG. 14, as an example, a spiral S may be formed (e.g., as a helix) that includes bend end portions 856 and 858 that decrease a gap 859 between the end portions 856 and 858. Referring to FIG. 15, in another embodiment, a central portion 860a and 860b of spirals S and S2 include bend portions 862a and 862b that decrease a gap 864 between the spirals S1 and S2.

Figure 16:
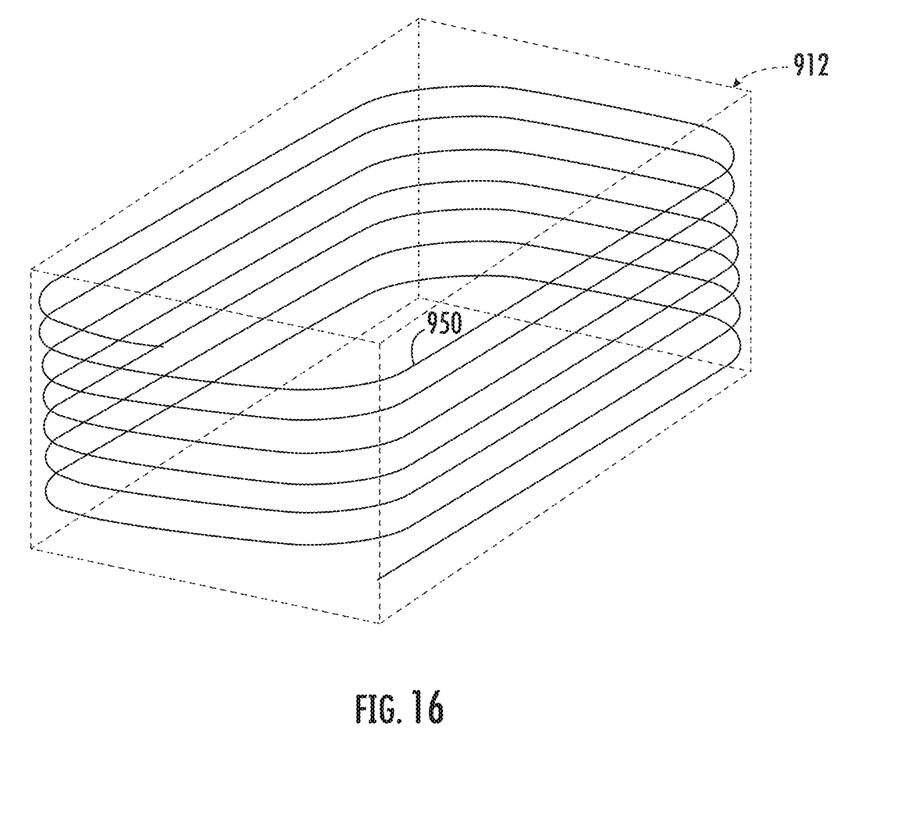
FIG. 16 is a diagrammatic perspective view of another strengthened glass article including an intended line of separation, according to one or more embodiments shown and described herein.

Using the methods described herein, strengthened glass articles may be separated along one or more predetermined intended lines of separation in response to axial propagation of a crack that is initiated somewhere along the glass body. The glass articles may be separated along the intended line of separation with little to no chipping along the edge created by separation of the glass body along the intended line of separation. While intended lines of separation in the enlarged portions of the glass bodies are described above, the intended lines of separation may be located on the shoulders and/or the necked-down regions. A single pass of the laser may be used or multiple passes may be used. As one example, multiple intended lines of separation may be provided, one over the other, that are radially spaced-apart. Further, the intended lines of separation may be used to intentionally separate the glass articles into multiple pieces, for example, in response to an applied force. The intended lines of separation may be formed only after strengthening the glass article, or glass tube stock used to form the glass article. While round or circular-shaped intended lines of separation are described herein, the shape of the intended line of separation can be defined primarily by the shape of the glass body. For example, FIG. 16 illustrates an intended line of separation 950 in the shape of a rectangular helix for use with a corresponding rectangular glass body 912. While relatively regular shapes are shown formed using the intended lines of separation, other shapes are possible, such as irregular shapes, such as irregular curves or twists.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method of forming a strengthened glass article, the method comprising:
   providing a strengthened glass article, the strengthened glass article being in the form of a container comprising a sidewall having an exterior surface and an interior surface that encloses an interior volume, the sidewall having an exterior strengthened surface layer that includes the exterior surface, an interior strengthened surface layer that includes the interior surface and a central layer between the exterior strengthened surface layer and the interior strengthened surface layer that is under a tensile stress; and
   forming a laser-induced intended line of separation in the central layer at a predetermined depth between the exterior strengthened surface layer and the interior strengthened surface layer by irradiating the sidewall with a laser without separating the glass article,
   wherein the intended line of separation forms a spiral shape that comprises a single turn and is open ended having overlapping first and second end portions, and
   wherein a gap is provided between the first end portion and the second end portion, wherein the gap has an axial distance of no more than 1 mm.

2. The method of claim 1, wherein the intended line of separation extends completely about a perimeter of the sidewall.

3. The method of claim 1 comprising forming multiple laser-induced intended lines of separation in the central layer at a predetermined depth between the exterior strengthened surface layer and the interior strengthened surface layer by irradiating the sidewall with a laser without separating the glass article.

4. The method of claim 1, wherein the laser is a nanosecond pulsed laser operated at a power of less than 3 W.

5. The method of claim 1, wherein the central layer has a tensile stress of at least about 13 MPa.

6. The method of claim 5, wherein a thickness of the sidewall at the intended line of separation is between 0.6 mm and 1 mm.

* * * * *